(No Model.) 2 Sheets—Sheet 1.

W. C. THORNTON.
MILK CAN.

No. 419,735. Patented Jan. 21, 1890.

WITNESSES:
W. R. Davis
C. Sedgwick

INVENTOR:
W. C. Thornton
BY Munn & Co.
ATTORNEYS.

(No Model.)  2 Sheets—Sheet 2.

W. C. THORNTON.
MILK CAN.

No. 419,735. Patented Jan. 21, 1890.

WITNESSES:
W. R. Davis
C. Sedgwick

INVENTOR:
W. C. Thornton
BY Munn & Co
ATTORNEYS.

UNITED STATES PATENT OFFICE.

WILLIAM CLARK THORNTON, OF JEFFERSON CITY, MISSOURI.

MILK-CAN.

SPECIFICATION forming part of Letters Patent No. 419,735, dated January 21, 1890.

Application filed July 24, 1889. Serial No. 318,569. (No model.)

*To all whom it may concern:*

Be it known that I, WILLIAM CLARK THORNTON, of Jefferson City, in the county of Cole and State of Missouri, have invented a new and useful Improvement in Milk-Cans, of which the following is a full, clear, and exact description.

My invention relates to an improvement in milk-cans used for cooling and shipping milk.

One object of my invention is to provide a receptacle for new milk which is adapted to hermetically seal the contents from atmospheric air or water if the named liquid is employed to cool the milk within the can.

A further object is to produce a simple, compact, and convenient milk-can which is adapted to seal the contents and permit the submerging of a filled can in a cistern or spring of water, whereby the new warm milk will be speedily cooled, contained water condensed and removed, as well as animal exhalation or odor which pervades the new milk and cream.

A further object is to construct a milk-can so as to permit the free circulation of water or other cooling-liquid through the body of the can longitudinally, and thus afford additional surface for cooling the contents of the can.

A further object is to provide a liquid seal for the milk-can, whereby the removable top of the same will be rendered air-tight, and in conjunction with said water seal my invention contemplates the employment of a fixed air-cushion, which is secured above the contents of the can.

A further object is to construct a milk-can so that it may be used to separate the cooled milk from the cream and indicate when such a separation has been completed.

With the objects in view as stated my invention consists in the peculiar construction and combination of parts, which will be hereinafter described, and pointed out in the claims.

Reference is to be had to the accompanying drawings, forming a part of this specification, in which similar letters of reference indicate corresponding parts in all the figures.

Figure 1:
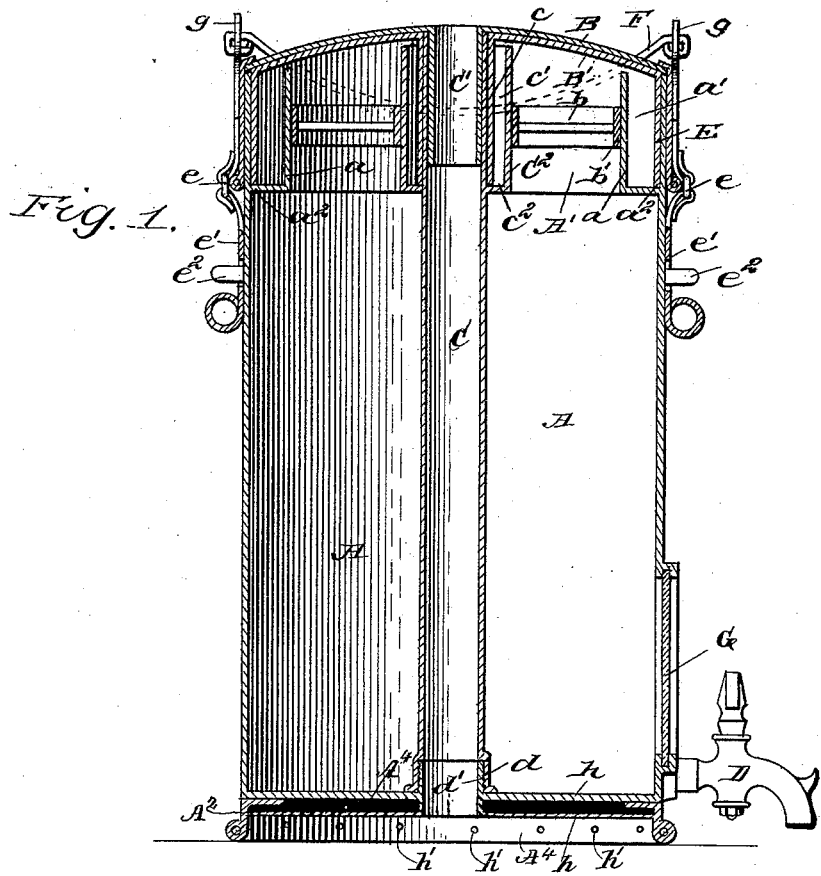
Figure 2:
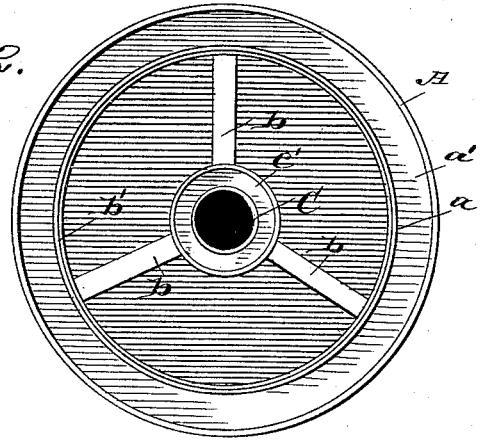
Figure 3:
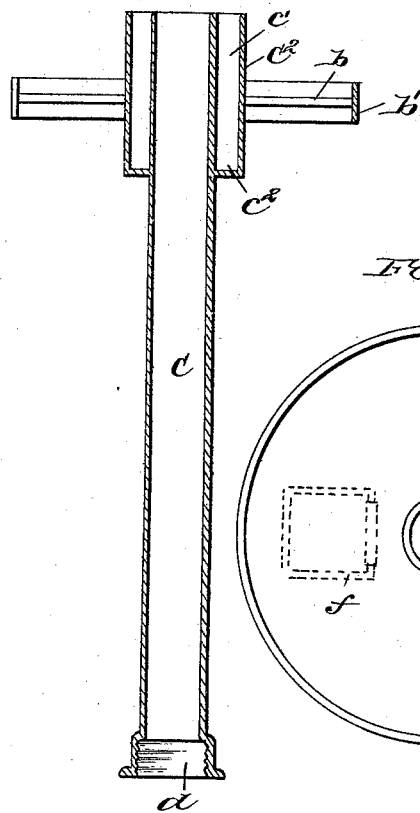
Figure 4:
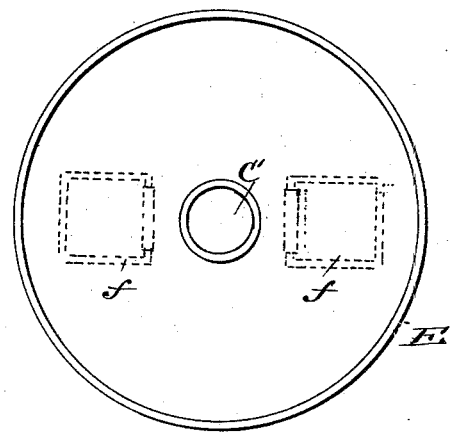
Figure 5:
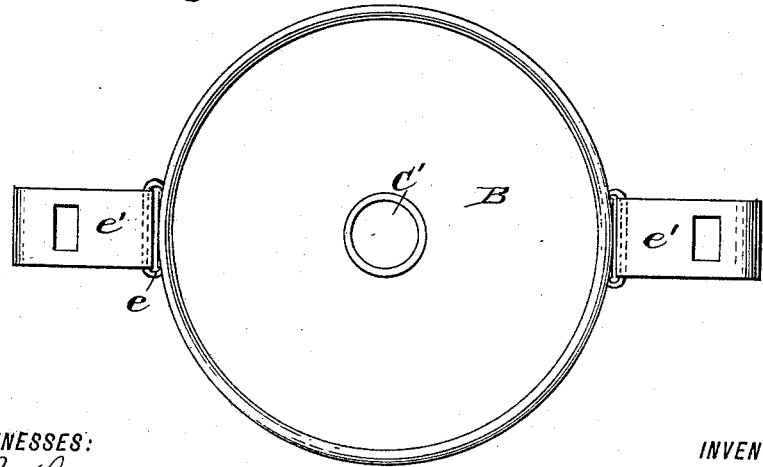

Figure 1 is a side elevation in section, taken through the axial center of the can. Fig. 2 is a top plan view of the can with both covers removed therefrom. Fig. 3 is a vertical section of one of the interior portions of the can removed from the shell. Fig. 4 is a bottom plan view of the inner cover of the can, and Fig. 5 is a bottom plan view of the outer cover of the can.

A represents the shell or body of the can. It is made of sheet metal properly coated with tin or other non-oxidizable metal or material. It is cylindrical, of proper dimensions for its uses, and stably constructed to withstand rough usage incidental thereto.

A depending skirt $A^2$ is secured below the bottom $h$, to shield the latter and prevent wear or injury. As will be seen, the bottom $h$ is double, with a space between, that is filled with lead or other heavy material $A^4$, that is adapted to sink the can in water, and air-escape holes $h'$ are formed in the flange $A^2$. Within the shell A, at its upper end, a concentric wall $a$ is secured by attachment of the radial base-flange $a^2$, formed on the wall and extended outwardly to engage the inner surface of the shell, as shown in Fig. 1.

Between the wall $a$ and shell A an annular space intervenes, into which the depending flange E of the cover B is made to slide and fit neatly, it being important that the joint between the flange and shell should be water-tight, or nearly so.

Concentric with the shell A of the can, upon the bottom $h$, near its center, the thimble $d'$ is formed or affixed. This is of a proper diameter to afford a sufficient water-passage, as will be further explained, and has its exterior surface threaded to engage and support vertically the cylindrical stand-pipe C, that is tapped with a proper thread at its lower end to screw upon this thimble $d'$. If preferred, the stand-pipe C may be secured permanently to the bottom $h$.

Near the upper end of the stand-pipe C a surrounding wall $C^2$ is fastened thereon by the base-flange $c^2$, which extends between the two concentric cylindrical walls, this affording an annular channel $c'$ between them.

Upon the outside surface of the wall $C^2$ the radial arms $b$ are secured by their inner ends, and to their outer ends the ring $b'$ is fastened. The latter-named piece is of such relative diameter as to loosely fit within the cylindrical wall $a$, and serves to laterally support the upper end of the stand-pipe C, as shown in Fig. 1.

The outer cover or top B of the can is adapted to fit water-tight, or nearly so, upon the outer surface of the shell A at its upper end. It is furnished with a depending sleeve C', which is centrally affixed thereto and is of such relative diameter as to neatly fit the interior of the free upper end of stand-pipe C, into which it is inserted when the cover is in place, thus producing an open passage through the can centrally and vertically. It will be seen that the inner cover B' is also provided with a concentric thimble or sleeve $c$, which is of a proper diameter to slide within the annular space $c'$ when the cover is adjusted upon the upper end of the shell A.

The outer cover B has the handle or bail F looped fast in the usual manner to the ears $g$, so as to permit it to be folded down on either side, as shown in Fig. 1. These ears, being downwardly extended to the lower edge of the lid-flange, terminate in loops, to which are hinged by shackle-rings $e$ the slotted straps $e'$, that engage the projecting pins $e^2$, so as to fasten the outer lid firmly in place.

Upon the side wall A, near the lower terminal of the same, a faucet D is inserted to tap the interior of the can, and on one side of said faucet the transparent plate G, preferably made of glass, is secured liquid-tight by any preferred method.

The provision just mentioned will permit the contents of the can to be drawn off and the height of the same viewed when nearly all the milk has been removed, while the creams remains, which is afterward drawn off through the faucet D.

In using the device which has been described the can is filled up to the horizontal base-flange $a^2$. Water is now poured in the annular channels $a'$ $c'$ until they are about one-third full, or sufficient to form a secure seal for the depending flanges E and $c$ of the inner lid or cover B'. The outer cover B is placed in position so that its sleeve C' will enter the stand-pipe C and the straps $e'$ align with the studs or pins $e^2$, upon which these straps are adjusted, so as to lock the cover in an obvious manner.

If it is desired to employ the milk-can to cool, purify, and separate the milk and cream from each other, the can may be attached to a rope and lowered within a cistern containing cold water or submerged in a tank of ice-water, or it may be introduced into a spring of water to cool its contents. Ice may also be employed to cool the milk and cream; but where cold water is to be had in sufficient quantity the latter named will prove as effective and more economical. After the milk-can has been immersed in cold water for a proper length of time the contents will be cooled, and contained water, as well as animal odor prevalent in warm new milk, will be thrown off in form of vapor. This will rise into the fixed air-space A' and thence pass into the upper portions of the annular spaces $a'$ $c'$, where it will be condensed, assume liquid form, and be deposited upon the vertical walls of these annular channels or spaces, from which it will run into the contained water of said compartments.

It will be apparent that the vertical water-passage formed by the stand-pipe C will afford additional cooling-surface for the warm milk, which will reduce the time necessary to condense its contained vapor, throw off animal odor, and separate the cream from the milk.

When the milk has been drawn off into any receptacle, the covers being first removed to avoid siphoning out of the water in the sealing-channels $a'$ $c'$, the cream is drawn off through the faucet into another vessel. By rotating the stand-pipe C it may be removed and all parts of the can be cleaned properly for refilling of the same.

In operating creameries it is desirable to ascertain the amount of cream contained in a given quantity of new milk to determine its comparative worth and richness. This can will afford a ready means for effecting such a measurement if the plate G is graduated in inches and fractions of the same.

The cans used for transportation of milk may be immersed in cold water placed in suitable tanks, or ice in fragments may be employed instead of water and the milk be sealed, excluding the air while in transit. In case the milk is not to be cooled in transit the stand-pipe C may be closed with a cork or gum plug.

There is evident advantage secured in provision of the water seal for exclusion of the atmosphere from the milk in transit, as it is not so liable to become sour when so protected. Thunder-storms will have no effect on milk protected in cans constructed as herein shown.

Having thus fully described my invention, I claim as new and desire to secure by Letters Patent—

1. The combination, with a cylindrical shell, a stand-pipe removably secured to the shell, and two independent cylindrical walls attached to the stand-pipe and shell, thereby producing two annular water-holding channels within the shell, of an inner cover having two concentric depending flanges that are adapted to slide in the annular water-holding compartments, and an outer cover which is provided with means to removably secure it to the shell, substantially as set forth.

2. The combination, with a cylindrical shell, a central stand-pipe, two independent concentric water-holding channels formed within that are adjacent to the stand-pipe and shell, an inner cover having two depending concentric flanges that enter the water-holding channels, and an outer cover removably secured to the shell, of a transparent sight-plate that is secured liquid-tight in the shell near its lower end and adapted to show its contents, and a decanting-faucet also attached to the lower portion of the shell, substantially as set forth.

WILLIAM CLARK THORNTON.

Witnesses:
ANDREW GUNDELFINGER,
FRED HOLLWORTH.